3,227,636
METHOD OF BONDING COATINGS
Harold George De Hart, Clifton, N.J., assignor, by mesne assignments, to International Protected Metals, Inc., a corporation of New Jersey
No Drawing. Continuation of application Ser. No. 132,006, Aug. 17, 1961. This application Oct. 29, 1964, Ser. No. 407,542
4 Claims. (Cl. 204—38)

This application is a continuation of application Serial No. 132,006 filed August 17, 1961, now abandoned.

The present invention deals with a method of bonding coatings and more particularly with a method of bonding coatings of thermoplastic materials to metal surfaces.

Thermoplastic and thermosetting resin coatings contemplated in accordance with this invention are provided on metal surfaces, for example, by fusing such materials onto the metal surfaces in various manners. The coating material may be applied to a metal surface as an aqueous dispersion of particles and transformed thereon, by fusion, into a coherent fused layer after evaporation of the liquid vehicle, or the coating may be applied by dipping the heated metal into a loosely settled bed of thermoplastic powder, or by contacting the heated metal with a fluidized powder bed, or by contacting the heated metal with a bed of powder in a state of aeration intermediate that of a fluidized bed and the loosely settled powder, or by spraying the heated metal with thermoplastic powder.

Certain thermoplastic materials, such, for example, as chlorinated polyethers and fluorocarbon resins, especially polytrifluorochloroethylene, are either reluctant to bond satisfactorily with certain metals, or they readily lose their bond when employed under certain conditions, e.g. as a result of the action of water. The use of other materials such as glasses, paints, lacquers, asphalts and enamels are also herein contemplated and are also not entirely satisfactorily bonded to metals.

The method according to the invention concerns the pretreating of a material to be coated, e.g. a metal such as aluminum or steel, or other metals and alloys, to clean the material, subsequently treating the cleaned surface with an arsenic compound-containing solution, and fusing or otherwise applying a layer of protective material to the treated surface.

It is an object of the invention to provide a method of bonding protective coatings to metals which will result in a strong bond of the coating to the metal.

It is another object of the invention to provide a method of bonding thermoplastic materials to metals by treating the metal surface with a strong bond producing material and subsequently fusing a coating of thermoplastic material to the treated surface.

It is a further object of the invention to provide a method of bonding fusible materials to metal surfaces treated with a solution containing essentially a compound of arsenic.

Other objects and advantages of the invention will become apparent from the description hereinafter following.

Various manners of applying protective coatings to metal surfaces as hereinabove recited by way of example, are employed in the coating of base materials, especially metals, by fusing or otherwise bonding the coating material onto a surface of the base material subsequent to the treatment thereof by an arsenic compound containing solution.

Base materials to be coated with a protective coating are prepared for coating by methods substantially as set forth in the following examples:

*Example I*

A strip of steel 3″ long, 1″ wide and ¾₁₆″ thick was first degreased with the organic solvent trichloroethylene by dipping the strip into the solvent and subsequently drying in air.

The strip was then cleaned by placing it into an alkaline electrolyte solution composed of water containing dissolved therein 1 lb. per gallon of sodium hydroxide and 3 lbs. per gallon of trisodium phosphate.

The strip was mounted in the electrolyte as an electrode with another strip of identical and degreased steel mounted therein as another electrode. Electrical current at 12 volts D.C. was impressed on the electrodes and the current was periodically reversed every 5 to 10 seconds. The number of reversals is a function of the condition of the surface of the strips and in this case six reversals were employed and terminated with the strip to be coated as an anode at the last reversal.

The strip to be coated was removed from the electrolyte, rinsed in cold water, and immersed in a heated arsenic phosphate-containing solution containing 20 percent of 85 percent phosphoric acid. The solution was prepared by dissolving to saturation $As_2O_3$ in a gallon of 85 percent phosphoric acid to form a saturated solution of arsenic phosphate. This solution was then diluted with four times its volume of water and heated to 150° F. The steel strip was immersed into the resultant solution for from 5 to 10 minutes. The strip was then rinsed in cold water and was then ready for the coating operation. In coating, the strip was heated above the fusing temperature of a powdered chlorinated polyether and immersed into a bed of the powder which was aerated to a state of aeration intermediate that of a fluidized bed and that of a bed of loosely settled powder until a fused layer of the chlorinated polyether was formed thereon.

*Example II*

A strip of steel, as described in Example I, was degreased and cleaned in the manner described in the example. The two electrodes were mounted in another aqueous electrolyte solution of 1 lb. per gallon of $As_2O_3$, 1 lb. per gallon of sodium hydroxide, and ½ oz. per gallon of sodium cyanide at room temperature. A voltage of 1–1½ volts D.C. was impressed on the electrodes for from 3–4 minutes and the cathode, the strip to be coated, was plated with a thin grayish deposit of arsenic. The plated cathode was removed, rinsed with cold water, and coated with the fused plastic layer as described in Example I.

*Example III*

A strip of steel, as described in Example I was degreased and cleaned in the manner described in the example. The two electrodes were mounted in another aqueous electrolyte solution of 50 cc. 37 percent HCl, 0.35 gram $AsCl_3$, 0.2 gram heptahydrate ferrous sulphate and 0.35 gram pentahydrate copper sulphate in 450 cc. of water. A voltage of 1–12 volts D.C. at a current density of 10–200 amps per sq. ft. was impressed on the electrodes for from 2–30 minutes depending on the current density, e.g., 30 minutes at 10 amps and 2 minutes at 100 amps. The plated cathode was removed and exhibited a thin grayish deposit characterized by microscopic heterogeneous dendritic-like growths throughout the plated surface area. It is believed that the plating deposited an alloy of arsenic and copper. The plated cathode was rinsed in cold water, heated above the fusing temperature of powdered fluorinated ethylene propylene, and immersed in a fluidized bed of the powder whereby a fused layer of fluorinated ethylene propylene was formed thereon.

Example IV

A strip of aluminum of the same size as the steel strips in the previous examples and without pretreatment, was immersed in the solution particularly described in Example III for ten minutes without application of electric current, and was subsequently coated with a fused layer under the exact conditions recited in Example IV.

The coated steel strips provided by employing the conditions of Examples I and II showed excellent adherance of the coating and the bond was resistant to removal by prying with a knife. It was found that in all cases some surface plastic was removed but the bond layer could not be removed.

The coated strip according to Example III was given a boiling water test by being kept immersed in the boiling water for 1000 hours and thereafter exhibited no peeling or loss of bond by the knife prying procedure.

The coated aluminum strip according to Example IV was given a boiling water test by being kept immersed in the boiling water for 8000 hours and thereafter exhibited no peeling or loss of bond by the knife prying procedure.

While the above Examples III and IV disclose compounds of arsenic together with a compound of copper in the plating solution, the copper compound may be substituted or supplemented by compounds of Ni, Bi, Cd, Sb, Ag, Pb and Sn.

Also, while the arsenic compounds arsenic trioxide and arsenic trichloride are referred to, sodium arsenate ($NaAsO_2$) may be employed in the same proportions.

In addition to coating the base materials with thermoplastic resins by fusion bonding, paints and enamels etc., may be applied with their vehicles onto unheated base materials treated with the arsenic compounds and permitted to dry bond onto the treated base with or without the application of heat treatment.

Various modifications of the invention are contemplated within the scope of the appended claims.

What is claimed is:

1. The method of bonding a plastic coating to a base metal surface comprising cathodically electrolytically treating the base metal surface with an aqueous solution of hydrochloric acid, copper sulfate and a metal compound selected from the group consisting of arsenic trioxide and arsenic trichloride for from 2 to 30 minutes under current densities of from 10 amperes to 200 amperes per sq. ft. whereby the said surface is plated with a plating having microsocpic dendritic-like growths throughout the surface thereof, and supplying a thermoplastic coating material to the treated surface by heating the base metal surface and fusing the coating materials to the said treated surface.

2. The method of bonding a plastic coating to a base metal surface according to claim 1, comprising contacting the heated base metal surface with a bed of aerated resin powder in a state of aeration intermediate that of a fluidized bed and that of a bed of loosely settled powder, whereby a fused layer of resin is formed on the treated surface.

3. The method according to claim 1, wherein said aqueous solution contains at least one additive compound of at least one of the metals nickel, bismuth, cadmium, antimony and tin.

4. The method according to claim 1, wherein the metal base is composed of aluminum.

References Cited by the Examiner
UNITED STATES PATENTS

| | | | |
|---|---|---|---|
| 931,944 | 8/1909 | Mathers | 204—1 |
| 2,802,067 | 4/1936 | Domm | 204—38 |
| 2,802,897 | 8/1957 | Hurd et al. | 204—38 |
| 2,915,417 | 12/1959 | Potuin | 204—38 X |

JOHN H. MACK, *Primary Examiner.*